(12) United States Patent
Hickam

(10) Patent No.: US 7,616,421 B2
(45) Date of Patent: Nov. 10, 2009

(54) ELECTRICAL INTERFACE SYSTEM

(75) Inventor: Christopher D. Hickam, Glasford, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/948,282

(22) Filed: Nov. 30, 2007

(65) Prior Publication Data

US 2009/0141412 A1    Jun. 4, 2009

Related U.S. Application Data

(60) Provisional application No. 61/007,912, filed on Dec. 18, 2006.

(51) Int. Cl.
| | |
|---|---|
| *H02H 3/08* | (2006.01) |
| *H02H 9/02* | (2006.01) |
| *H02J 7/00* | (2006.01) |
| *H02H 9/08* | (2006.01) |
| *H02H 3/20* | (2006.01) |
| *H02H 9/04* | (2006.01) |
| *H02H 3/00* | (2006.01) |

(52) U.S. Cl. .................. 361/93.1; 361/93.9; 361/91.1; 361/91.2; 361/91.7; 361/82; 361/84; 320/134

(58) Field of Classification Search ............... None
See application file for complete search history.

(56) References Cited

U.S. PATENT DOCUMENTS

| | | | |
|---|---|---|---|
| 3,512,043 A | 5/1970 | Werner et al. | |
| 3,970,785 A | 7/1976 | Meyer | |
| 4,090,227 A | 5/1978 | Schweitzer | |
| 4,212,507 A | 7/1980 | Bunnell | |
| 4,229,688 A | 10/1980 | Knox et al. | |
| 4,628,818 A | 12/1986 | Nilsson | |
| 4,820,193 A | 4/1989 | Noorily | |
| 4,955,823 A | 9/1990 | Luzzi | |
| 4,962,462 A | 10/1990 | Fekete | |
| 4,971,568 A | 11/1990 | Cronin | |
| 5,004,435 A | 4/1991 | Jammet | |
| 5,061,196 A | 10/1991 | Weston et al. | |
| 5,075,813 A | 12/1991 | Takabayashi | |
| 5,134,320 A | 7/1992 | Perusse | |
| 5,177,426 A | 1/1993 | Nakanishi et al. | |

(Continued)

FOREIGN PATENT DOCUMENTS

DE           35 04 560        8/1986

(Continued)

*Primary Examiner*—Albert W Paladini
*Assistant Examiner*—Dharti Patel
(74) *Attorney, Agent, or Firm*—Richard K. C. Chang, II

(57) ABSTRACT

An interface system may be used to connect an electrical device to an electrical bus. The interface system may include a first end and a second end in electrical communication with the first end. Where the interface system is used to connect an electrical device to an electrical bus, the first end may be connected to the electrical bus and the second end may be connected to the electrical device. The interface system may also include a reverse current blocking circuit configured to block current from flowing from the second end to the first end. Additionally, the interface system may include a discharge circuit electrically connected between the first end and the second end for discharging the blocked current.

20 Claims, 3 Drawing Sheets

U.S. PATENT DOCUMENTS

| | | | |
|---|---|---|---|
| 5,225,958 A | 7/1993 | Nakamura | |
| 5,238,422 A | 8/1993 | Scherer | |
| 5,252,082 A | 10/1993 | Hsieh et al. | |
| 5,267,868 A | 12/1993 | Wolff, Jr. | |
| 5,352,128 A | 10/1994 | Bricaud | |
| 5,353,185 A | 10/1994 | Bodkin | |
| 5,357,089 A | 10/1994 | Prentice | |
| 5,401,180 A | 3/1995 | Muzslay | |
| 5,425,649 A | 6/1995 | Reymond | |
| 5,486,992 A | 1/1996 | Koscica et al. | |
| 5,518,411 A | 5/1996 | Belleci | |
| 5,539,299 A * | 7/1996 | Fernandez et al. | 320/163 |
| 5,584,713 A | 12/1996 | Kato et al. | |
| 5,667,389 A | 9/1997 | Kidd et al. | |
| 5,697,501 A | 12/1997 | Johansen | |
| 5,703,471 A * | 12/1997 | Bullock et al. | 320/134 |
| 5,714,869 A * | 2/1998 | Tamechika et al. | 320/101 |
| 5,726,505 A | 3/1998 | Yamada et al. | |
| 5,757,600 A | 5/1998 | Kiraly | |
| 5,763,814 A | 6/1998 | Avory et al. | |
| 5,828,261 A | 10/1998 | Antone et al. | |
| 5,867,008 A * | 2/1999 | Du et al. | 320/136 |
| 5,949,160 A | 9/1999 | Anderson et al. | |
| 5,989,046 A | 11/1999 | Togashi | |
| 5,998,885 A | 12/1999 | Tamor et al. | |
| 6,043,965 A | 3/2000 | Hazelton et al. | |
| 6,049,143 A | 4/2000 | Simpson et al. | |
| 6,167,291 A | 12/2000 | Barajas et al. | |
| 6,184,660 B1 * | 2/2001 | Hatular | 320/141 |
| 6,196,858 B1 | 3/2001 | Matsumoto et al. | |
| 6,278,598 B1 | 8/2001 | Suzuki et al. | |
| 6,409,526 B1 | 6/2002 | Malone et al. | |
| 6,476,571 B1 | 11/2002 | Sasaki | |
| 6,603,286 B2 * | 8/2003 | Herrmann et al. | 320/134 |
| 6,652,001 B2 | 11/2003 | Furui | |
| 6,657,475 B1 | 12/2003 | Zahn | |
| 6,765,804 B2 | 7/2004 | Hudson et al. | |
| 6,770,986 B2 | 8/2004 | Nagao et al. | |
| 6,815,929 B1 * | 11/2004 | Dagan et al. | 320/121 |
| 6,835,079 B2 | 12/2004 | Gentry et al. | |
| 6,838,923 B2 | 1/2005 | Pearson | |
| 6,932,643 B2 | 8/2005 | Bigotto | |
| 6,979,787 B2 | 12/2005 | Davies | |
| 6,992,463 B2 | 1/2006 | Yoshio | |
| 7,139,157 B2 * | 11/2006 | Taylor | 361/84 |
| 2002/0036432 A1 | 3/2002 | Nagao et al. | |
| 2002/0149266 A1 | 10/2002 | Tahara | |
| 2003/0040228 A1 | 2/2003 | Finzer et al. | |
| 2003/0220006 A1 | 11/2003 | Gentry et al. | |
| 2004/0085692 A1 | 5/2004 | Bodeau et al. | |
| 2004/0110397 A1 | 6/2004 | Chen | |
| 2004/0169496 A1 | 9/2004 | Rutter et al. | |
| 2004/0228053 A1 | 11/2004 | Thiery et al. | |
| 2005/0037662 A1 | 2/2005 | Sheng et al. | |
| 2005/0143846 A1 | 6/2005 | Kocher et al. | |
| 2005/0170688 A1 | 8/2005 | Chen | |
| 2005/0269880 A1 | 12/2005 | Konishi | |
| 2005/0275983 A1 | 12/2005 | Franklin et al. | |
| 2006/0035116 A1 | 2/2006 | Kanouda et al. | |

FOREIGN PATENT DOCUMENTS

| | | |
|---|---|---|
| EP | 1335471 | 8/2003 |
| EP | 1605556 | 12/2005 |
| WO | WO 03/081777 | 10/2003 |

* cited by examiner

Fig-1-
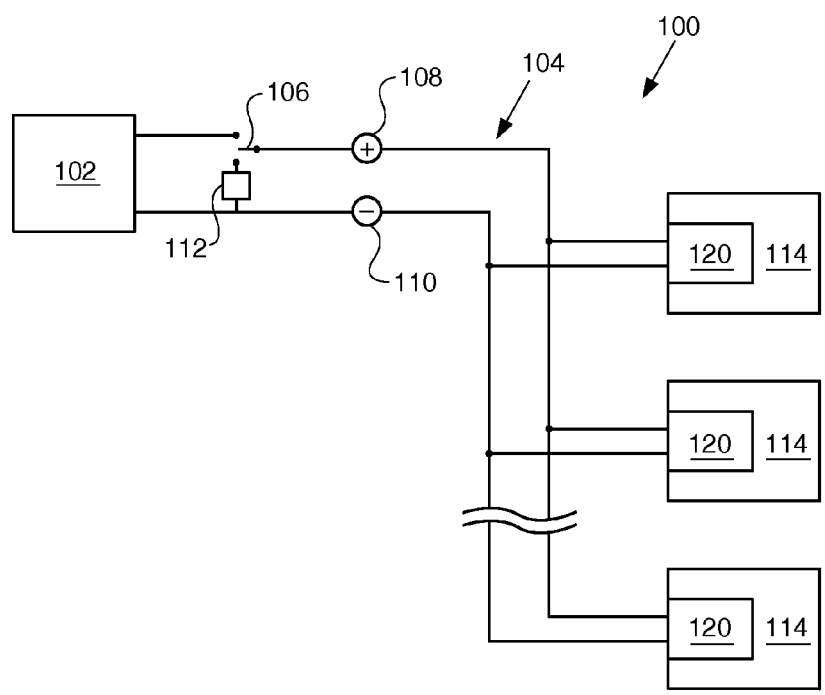
Fig-2-
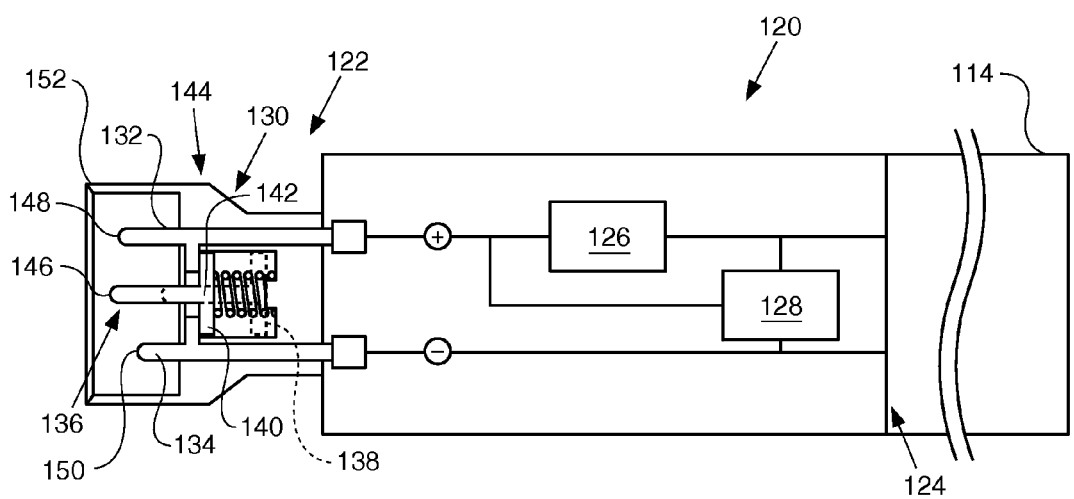

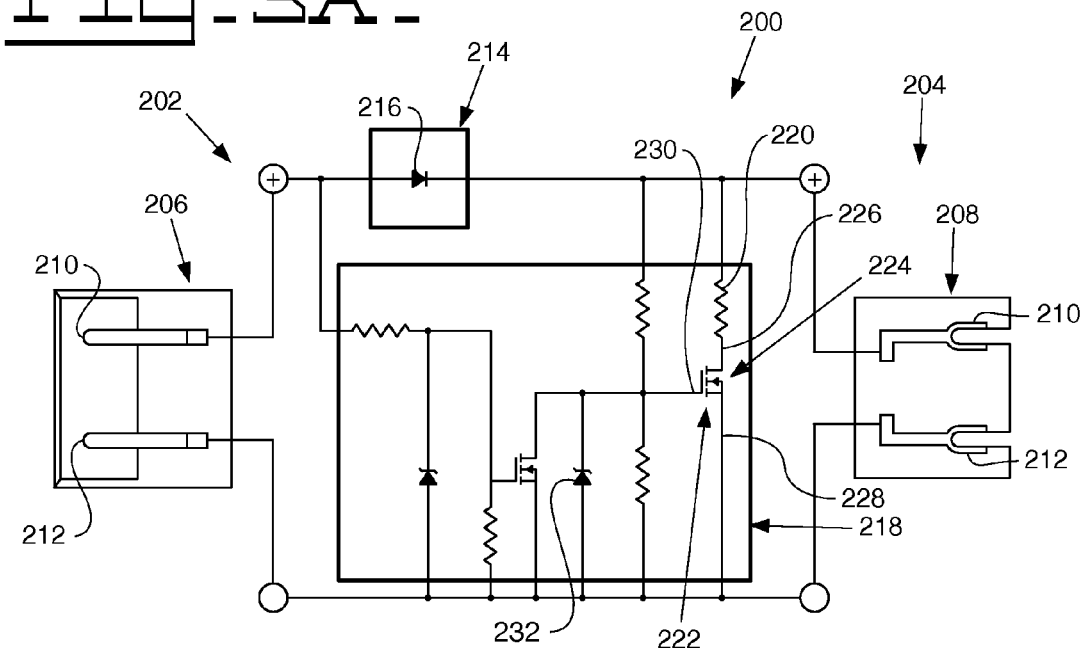
Fig-3A-
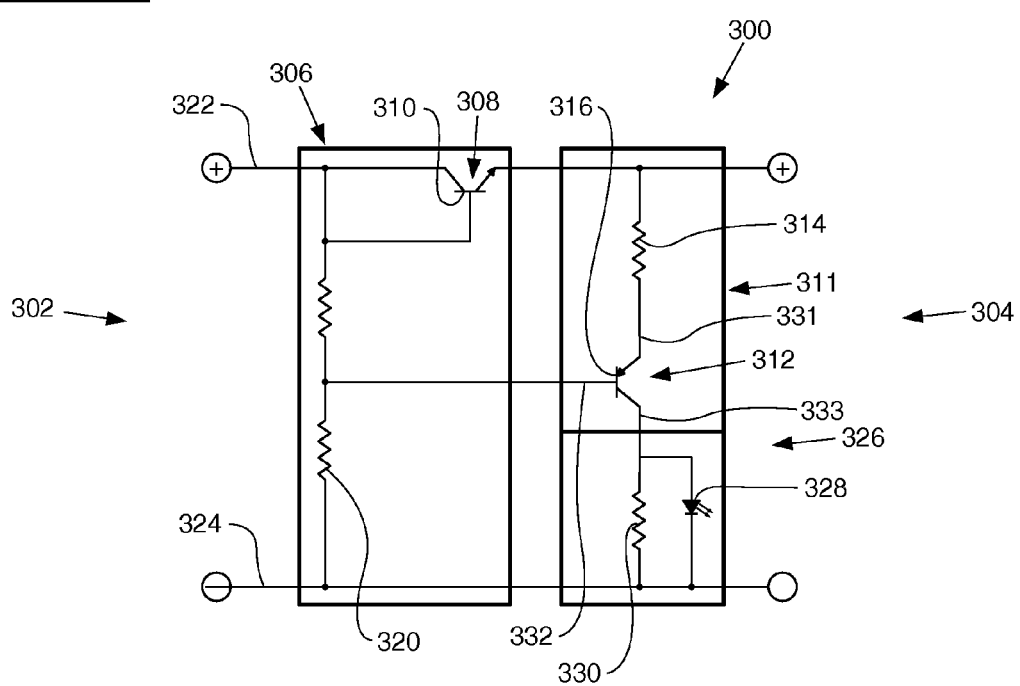
Fig-3B- ately long period of time may be required for the electrical bus to return to a low energy state where the electrical potential between the positive line and the negative line is minimal. Because of this long period of time, repair and maintenance times and costs may be increased dramatically as technicians are forced to wait for the electrical bus to return to a low energy state before beginning repairs.
ELECTRICAL INTERFACE SYSTEM

CROSS-REFERENCED TO RELATED APPLICATIONS

This application claims the benefit of U.S. Provisional Application No. 61/007,912, filed Dec. 18, 2006.

STATEMENT OF GOVERNMENT INTEREST

The United States Government has certain rights in the present application, and any patent that may issue thereon, under DOE Contract No. DE-FC26-04NT42258.

TECHNICAL FIELD

This invention relates generally to electrical systems having an electrical bus.

BACKGROUND

Electrical buses are used in a variety of applications including electric vehicles and computers. An electrical bus is a parallel circuit that is used to connect a plurality of electrical devices together with power sources, such as generators, solar cells, and batteries. Electrical buses may be used in high power applications to deliver power from a power source to the electrical devices. Typically, electrical buses may be used in direct current applications and may have a positive line and a negative line (or ground line).

A problem that may arise in direct current applications is that electrical devices may store electrical power. Consequently, when the electrical bus is disconnected from a power source, the electrical devices continue to energize the electrical bus with the stored electrical power. Thus, a relatively long period of time may be required for the electrical bus to return to a low energy state where the electrical potential between the positive line and the negative line is minimal. Because of this long period of time, repair and maintenance times and costs may be increased dramatically as technicians are forced to wait for the electrical bus to return to a low energy state before beginning repairs.

The present invention is directed to overcome one or more of the problems as set forth above.

SUMMARY OF THE INVENTION

The interface system may include a first end and a second end in electrical communication with the first end. The interface system may also include a reverse current blocking circuit configured to block current from flowing from the second end to the first end. Additionally, the interface system may include a discharge circuit electrically connected between the first end and the second end for discharging the blocked current.

The interface system may be used to connect in an electrical system such that the first end may be connected to an electrical bus and the second end may be connected to an electrical device. Of course, the interface system may be used in other applications including directly connecting an electrical device to a power source.

The electrical bus may be connected to a power source providing current to the electrical bus. Additionally, the electrical system may include a plurality of electrical devices in electrical communication with the electrical bus. In these configurations of the electrical system, one or more of the plurality of electrical devices may be connected to the electrical bus via the interface system. Of course, all of the electrical devices may be connected to the electrical bus through an interface system.

When the interface system is connected in an electrical system to an electrical bus and an electrical device, the reverse current blocking circuit prevents current from flowing from the at least one electrical device to the electrical bus when the power source is disconnected from the electrical bus. Additionally, the discharge circuit discharges electrical power stored within the electrical device when the power source is disconnected from the electrical bus.

BRIEF DESCRIPTION OF THE DRAWINGS

FIG. 1 is a schematic view of an electrical system that includes an interface system.

FIG. 2 illustrates an interface system connected to an electrical device.

FIGS. 3A and 3B are schematic views of interface systems.

DETAILED DESCRIPTION

Figure 4:
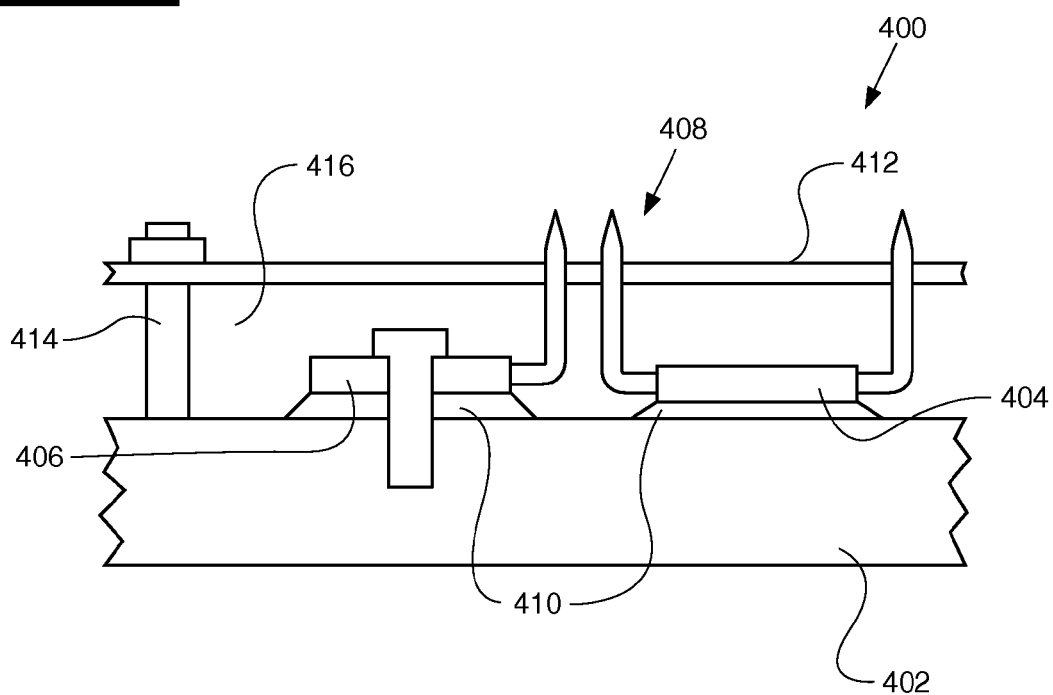
FIG. 4 is a cross sectional view of components of an interface system.

Referring to FIG. 1, a schematic view illustrates an electrical system 100 that may include a power source 102, an electrical bus 104, and a switch 106 connecting the power source 102 with the electrical bus 104. The power source 102 provides current to and energizes the electrical bus 104. The power source 102 may include a generator, a battery, a fuel cell, a solar cell, or any other power source known in the art.

The electrical bus 104 may have a positive line 108 and a negative line 110 that may be connected to the power source 102 through the switch 106. The switch 106 has a first mode in which the switch 106 places the electrical bus in electrical communication with the power source 102. The switch 106 also has a second mode in which the switch 106 electrically connects the positive line 108 with the negative line 110.

The switch 106 may be a mechanical switch such as a bi-stable mechanism. Of course, the switch 106 may be any other type of switch known in the art including electrical switches such as power transistors and electromechanical switches such as solenoid and relay operated switches.

In configurations of the electrical system 100 that include a switch 106, the electrical system 100 may also include a bus discharge circuit 112. The bus discharge circuit 112 is disposed between the switch 106 and the negative line 110 so that when the switch 106 is in the second mode, current is permitted to pass over the bus discharge circuit 112 between the positive line 108 and the negative line 110. The bus discharge circuit 112 may include a power resistor (not shown) disposed between the positive line 108 and the negative line 110.

The electrical system 100 may also include a plurality of electrical devices 114 and an interface system 120 that may connect each electrical device 114 to the electrical bus 104. Of course, some of the electrical devices 114 may be connected directly to the electrical bus 104. The electrical devices 114 may be electrical control modules, sensor modules, motors, HVAC systems, pumps, and personal entertainment equipment such as view screens, video game and media players, GPS devices, computers, and other devices known in the art. Electrical devices 114 may also include other electrical devices known in the art and devices that store power through capacitance.

The interface system 120 operates to prevent the connected electrical device 114 from providing electrical power to the electrical bus 104 once the power source 102 has been disconnected from the electrical bus 104 by either placing the switch 106 in the second mode or through damage to the electrical bus 104. Consequently, a repair person can perform maintenance or repair to the electrical bus 104 soon after the disconnection of the power source 102 takes place. Additionally, the interface system 120 permits the repair person to quickly remove electrical devices 114 from the electrical bus 104 should the need arise.

Referring to FIG. 2, a configuration of the interface system 120 is shown connected to one of the electrical devices 114. More specifically, the interface system 120 may be part of the electrical device 114. In other words, the interface system 120 may include a first end 122 and a second end 124 in electrical communication with the first end 122 and electrically connected to the electrical device 114.

Between the first and second ends 122, 124, the interface system 120 may include a reverse current blocking circuit 126 configured to block current from flowing from the second end 124 to the first end 122. More specifically in this configuration, the reverse current blocking circuit 126 may be configured to prevent current from flowing from the electrical device 114 to the first end 122. In the configuration of FIG. 1, the reverse current blocking circuit 126 may be configured to block current from flowing from the electrical device 114 to electrical bus 104 when the power source 102 is disconnected from the electrical bus 104.

The interface system 120 may also include a discharge circuit 128 electrically connected between the first and second ends 122, 124. The discharge circuit 128 may be used to discharge the current blocked by the reverse current blocking circuit 126. In the configuration of FIG. 1, the discharge circuit 128 may be used to discharge electrical power stored within the electrical device 114 when the power source 102 is disconnected from the electrical bus 104.

The first end 122 of the interface system 120 may include an electrical connector 130 that facilitates connecting the electrical device 114 to the electrical bus 104 of FIG. 1. As shown, the electrical connector 130 may include a first contact 132 and a second contact 134. In this configuration of the interface system 120, the reverse current blocking circuit 126 may prevent current from flowing from the second end 124 to the first contact 132.

The electrical connector 130 may include a shorting system 136 having an open condition 138 that disconnects the first contact 132 from the second contact 134 and a closed condition 140 in which current is allowed to flow from the first contact 132 to the second contact 134 through the shorting system 136. In illustrated configuration of the shorting system 136, the shorting system 136 may include a shorting arm 142 that moves between the open condition 138 and the closed condition 140 within a housing 144 of the electrical connector 130 to abut the first and second contacts 132, 134. In the open condition 138, the shorting arm 142 is positioned remotely from the first and second contacts 132, 134 which disconnects the first contact 132 from the second contact 134. In the closed condition 140, the shorting arm 142 abuts the first and second contacts 132, 134 to electrically connect the first contact 132 with the second contact 134 so that current is allowed to flow from the first contact 132 to the second contact 134 through the shorting system 136.

To help ensure that the shorting system 136 is in the open condition 138 when the electrical connector 130 is connected to the electrical bus 104 of FIG. 1, an end 146 of the shorting arm 142 may be disposed to contact the electrical bus 104 before a respective end 148, 150 of the first and second contacts 132, 134. For example, the end 146 of the shorting arm 142 may be extend further from the housing 144 than the ends 148, 150 of the first and second contacts 132, 134. In other words, when the electrical connector 130 is in electrical communication with the power source 102 of FIG. 1, the shorting system 136 is in the open condition 138. When the electrical connector 130 is disconnected from the electrical bus 104, the shorting system 136 is in the closed condition 140.

The electrical connector 130 may also include a shroud 152 to prevent accidental contact upon disconnection with the first and second contacts 132, 134 and the shorting arm 142.

Referring to FIG. 3A, a configuration of an interface system 200 is illustrated. As shown, the interface system 200 includes a first end 202 and a second end 204. The first end 202 may include a first electrical connector 206 configured for connecting to a power source, electrical bus, or electrical device (not shown). Similarly, the second end 204 may include a second electrical connector 208 configured for connection to an electrical device (not shown). As shown, the first and second electrical connectors 206, 208 each include a first contact 210 and a second contact 212.

The interface system 200 also includes a reverse current blocking circuit 214. The reverse current blocking circuit 214 may include a one-way diode 216 disposed between the first end 202 and the second end 204. More specifically, the one-way diode 216 may be disposed between the first contacts 210 of the first and second electrical connectors 206, 208. The one-way diode 216 blocks current from flowing from the second end 204 to the first end 202 while permitting current to flow from the first end 202 to the second end 204. In some configurations, the one-way diode 216 may be a power diode.

A discharge circuit 218 may be used to discharge current flow blocked by the reverse current blocking circuit 214. Consequently, the discharge circuit 218 may include a resistor 220 and may be disposed to electrically connect the first contact 210 of the second connector 208 with the second contact 212 of the second connector 208. In some configurations, the resistor 220 is a power resistor.

The discharge circuit 218 may also include an electrical switch 222 that may be placed in an open or closed state. When the electrical switch 222 is in the open state, current is prevented from flowing across the resistor 220. Conversely, when the electrical switch 222 is in the closed state, current flowing from the second end 204 is permitted to pass across the resistor 220. Additionally, when current is flowing across the reverse current blocking circuit 214 from the first end 202 to the second end 204, the electrical switch 222 may be in the closed state.

As shown, the electrical switch 222 may be a transistor 224 and more specifically, the electrical switch 222 may be an N-channel metal-oxide field-effect transistor. In some configurations, the transistor 224 may also be a power transistor.

The transistor 224 may have a drain 226, source 228, and a gate 230. The drain 226 may be in electrical communication with the first contact 210 of the second electrical connector 208 of the second end 204. The source 228 may be in electrical communication with the second contacts 212 of the first and second electrical connectors 206, 208 of the first and second ends 202, 204. The gate 230 may be in electrical communication with the first contact 210 of the first electrical connector 206 of the first end 202 and may be protected by a zener diode 232.

Referring to FIG. 3B, another interface system 300 is shown having a first end 302 and a second end 304. In this configuration, the interface system 300 may include a reverse current blocking circuit 306 that includes an electrical switch 308, such as a transistor 310, and more specifically an NPN transistor, disposed between the first and second ends 302, 304. The electrical switch 308 is disposed such that when the interface system 300 is connected to a power source and an electrical device (not shown) the electrical switch 308 is in a closed state that permits current to flow across the electrical switch 308 between the first and second ends 302 and 304. Conversely, when the power source is disconnected from the interface system 300, the electrical switch 308 is in an open state that blocks current flowing across the electrical switch 308 between the first and second ends 302 and 304.

The interface system 300 may also include a discharge circuit 311 having an electrical switch 312 and a resistor 314 for discharging current blocked by the reverse current blocking circuit 306. The resistor 314 may be a power resistor or any other resistor known in the art.

The electrical switch 312 may be a PNP transistor 316. A second resistor 320 provides a path from a positive side 322 to a negative side 324 of the interface system 300 in order to turn the electrical switch 312 on when power is removed from the interface system 300.

More specifically, the PNP transistor 316 may include an emitter 331 electrically connected to the positive side 322 and a base 332 electrically connected to positive side 322 on an opposite of the reverse current blocking circuit 306 from the emitter 331. Consequently, when power is removed from the interface system 300, the base of the PNP transistor 316 is allowed to obtain a potential close to the negative side 324 by allowing current to flow from the base 332 to the negative side 324 across the second resistor 320. Thus, the PNP transistor 316 is turned on when power is removed from the interface system 300. The PNP transistor 316 also includes a collector 333 electrically connected to the negative side 324.

In other words, when a power source (not shown) is disconnected from the first end 302 of the interface system 300, the second resistor 320 permits electrical energy on the first end 302 of the positive side 322, and thus, the base 332 to be discharged. The discharge of electrical energy permits the PNP transistor 316, and hence the electrical switch 312, to be placed in a closed state allowing current to flow over the resistor 314 and the electrical switch 312 to the negative side 324.

The interface system 300 may also include an indicator 326 for indicating that the discharge circuit 311 is discharging electrical power. In other words, the indicator 326 may indicate when current is flowing over the resistor 314 and the electrical switch 312. As shown, the indicator 326 may be a light emitting diode 328 in parallel with a resistor 330. The resistor 330 may cause a voltage drop across the light emitting diode 328 causing the light emitting diode 328 to emit light. The resistor 330 may also reduce the current flowing across the light emitting diode 328. Of course, the indicator 326 may be any type of indicator known in the art including a speaker for producing an audible signal or a sensor that detects the flow of current and indicates this on a view screen (not shown).

Referring to FIG. 4, an interface system 400 may include a heat sink 402 that is in thermal communication with a power resistor 404 and a power transistor 406 of a discharge circuit 408. A thermal gel or adhesive 410 may facilitate thermal transfer from the power resistor 404 and the power transistor 406.

The discharge circuit 408 may be formed on a printed circuit board 412 that is spaced from the heat sink 402 by a spacer 414. A resulting air gap 416 helps prevent the heat generated by passing current over the power resistor 404 and the power transistor 406 from damaging other components (not shown) of the discharge circuit 408 and the interface system 400.

INDUSTRIAL APPLICABILITY

The interface system described above facilitates the maintenance and repair of electrical buses by preventing electrical power stored within coupled electrical devices from energizing the electrical bus and by discharging the stored energy within the interface system. Consequently, the electrical bus can be quickly de-energized and then worked on by technicians while the electrical devices themselves may continue to store significant electrical energy. This may be especially useful in high power applications.

An electrical bus may be even more quickly discharged in electrical systems that also include a bus discharge circuit and an associated switch. The bus discharge circuit permits the power source to be disconnected while permitting current to pass over the bus discharge circuit.

Additionally, where the interface system includes an electrical connector configured for connection to an electrical bus, electrical devices can be disconnected from the electrical bus and/or power source while maintaining electrical isolation from a technician. Specifically, the interface system decreases the electrical potential between the contacts of the electrical connector once the interface system is disconnected from a power source.

It will be apparent to those skilled in the art that various modifications and variations can be made without departing from the scope or spirit of the invention. Additionally, other embodiments of the invention will be apparent to those skilled in the art from consideration of the specification and practice of the invention disclosed herein. It is intended that the specification and examples be considered as exemplary only.

What is claimed is:

1. An interface system comprising:
    a first end;
    a second end in electrical communication with the first end;
    a reverse current blocking circuit configured to block current from flowing from the second end to the first end, and
    a discharge circuit for discharging the blocked current, the discharge circuit electrically connected between the first end and the second end, wherein the discharge circuit includes an electrical switch that when the first end is connected to a power source the electrical switch in an open state and when the first end is disconnected from the power source, the electrical switch is in a closed state, wherein the discharge circuit does not discharge electrical energy in the open state and discharges electrical energy in the closed state.

2. The interface system of claim 1, wherein the reverse current blocking circuit includes a one-way diode disposed between the first end and the second end to block current from flowing from the second end to the first end while permitting current to flow from the first end to the second end.

3. The interface system of claim 1, wherein the reverse current blocking circuit includes a transistor disposed between the first end and the second end to block current from flowing from the second end to the first end while permitting current to flow from the first end to the second end, wherein when the transistor is blocking current, the electrical switch is in the closed state, and when the transistor is permitting current to flow, the electrical switch is in the open state.

4. The interface system of claim 1, wherein the electrical switch includes a transistor, wherein when the transistor is in the open state, power is being applied to the first end and the discharge circuit does not discharge electrical energy, wherein when the transistor is in the closed state, power has been removed from the first end and the discharge circuit discharges electrical energy.

5. The interface system of claim 4, further including a heat sink, wherein the discharge circuit further includes a resistor in electrical communication with the transistor, wherein the resistor and the transistor are in thermal communication with the heat sink.

6. The interface system of claim 1, wherein the first end includes a electrical connector having a first contact and a second contact, wherein the reverse current blocking circuit prevents current from flowing from the second end to the first contact.

7. The interface system of claim 6, wherein the electrical connector includes a shorting system having an open condition, wherein the shorting system does not short the first contact with the second contact, and a closed condition, wherein the shorting system shorts the first contact with the second contact so that current is allowed to flow from the first contact to the second contact through the shorting system, wherein the shorting system is placed in the closed condition when the interface system is disconnected from an electrical bus or power source.

8. The interface system of claim 1, wherein the interface system includes an indicator for indicating that the discharge circuit is discharging the blocked current, wherein the indicator includes a light emitting diode.

9. An electrical system comprising:
an electrical bus;
a power source providing current to the electrical bus;
an electrical device; and
an interface system connecting the electrical device with the electrical bus, the interface system including;
a reverse current blocking circuit configured to prevent current from flowing from the electrical device to the electrical bus when the power source is disconnected from the interface system, and
a discharge circuit for discharging electrical power stored within the electrical device when the power source is disconnected from the interface system, wherein the discharge circuit includes an electrical switch that when the interface system is connected to the power source the electrical switch in an open state and when the interface system is disconnected from the power source, the electrical switch is in a closed state, wherein the discharge circuit does not discharge electrical energy in the open state and discharges electrical energy in the closed state.

10. The electrical system of claim 9, wherein the reverse current blocking circuit includes a one-way diode such that current is permitted to flow from the electrical bus to the electrical device when the electrical bus is connected to the power source, and current is prevented from flowing from the electrical device to the electrical bus when the electrical bus is disconnected from the power source.

11. The electrical system of claim 9, wherein the reverse current blocking circuit includes a transistor such that current is permitted to flow from the electrical bus to the electrical device when the electrical bus is connected to the power source and current is prevented from flowing from the electrical device to the electrical bus when the electrical bus is disconnected from the power source.

12. The electrical system of claim 9, wherein the discharge circuit includes a resistor and the electrical switch includes a transistor that may be placed in an open state or a closed state, wherein when the transistor is in the open state, current is prevented from flowing across the resistor, wherein when the transistor is in the closed state, current flowing from the electrical device is permitted to pass across the resistor.

13. The electrical system of claim 12, wherein interface system includes a heat sink, wherein the resistor and the transistor are in thermal communication with the heat sink.

14. The electrical system of claim 9, wherein the interface system includes an electrical connector that facilitates connecting the electrical device to the electrical bus, the electrical connector including a first contact and a second contact and a shorting system having an open condition, wherein the shorting system does not short the first contact with the second contact, and a closed condition, in which current is allowed to flow from the first contact to the second contact through the shorting system, wherein when the electrical connector is in electrical communication with the power source, the shorting system is in the open condition and when the electrical connector is disconnected from the electrical bus, the shorting system is in the closed condition.

15. The electrical system of claim 9, wherein the interface system includes an indicator for indicating that the discharge circuit is discharging electrical power.

16. The electrical system of claim 9, further comprising a switch, wherein the electrical bus includes a positive line and a negative line, the switch having a first mode in which the switch places the electrical bus in electrical communication with the power source and a second mode in which the switch electrically connects the positive line with the negative line and disconnects the bus from the power source.

17. The electrical system of claim 16, further comprising a resistor disposed between the positive line and the negative line, such that when the switch is in the second mode, current is permitted to pass over the resistor between the positive line and the negative line.

18. The interface system of claim 1, further comprising a resistor connected to a positive side of the interface system between the second end and the reverse current blocking circuit and the electrical switch such that when the electrical switch is placed in the closed state by removal of the power source from the first end, current from the second end flows through the resistor and when the electrical switch is placed in the open state by connecting the first end to a power source, current is prevented from flowing through the resistor.

19. The interface system of claim 1, further comprising a resistor disposed between the first end and the reverse current blocking circuit and connecting a positive side of the interface system with a negative side of the interface system, wherein when power is removed, the resistor permits the positive side to be brought to the same potential as the negative side causing the electrical switch to be placed in the closed state.

20. The interface system of claim 4, wherein a base or gate of the transistor is connected to the first end so that when power applied to the first end places the transistor in the open state.

* * * * *